(12) United States Patent
Wray et al.

(10) Patent No.: US 8,745,389 B2
(45) Date of Patent: *Jun. 3, 2014

(54) AVOIDING PADDING ORACLE ATTACKS

(71) Applicant: International Business Machines Corporation, Armonk, NY (US)

(72) Inventors: John Clay Richard Wray, Chelsmford, MA (US); Peter James Argue, Littleton, MA (US); Krithika Prakash, Regina (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,191

(22) Filed: Mar. 1, 2013

(65) Prior Publication Data

US 2013/0343539 A1 Dec. 26, 2013

Related U.S. Application Data

(63) Continuation of application No. 13/528,382, filed on Jun. 20, 2012.

(51) Int. Cl.
*H04L 9/32* (2006.01)
(52) U.S. Cl.
USPC .......................................................... 713/168
(58) Field of Classification Search
None
See application file for complete search history.

(56) References Cited

U.S. PATENT DOCUMENTS 6,144,740 A 11/2000 Laih et al.
6,202,087 B1 * 3/2001 Gadish .......................... 709/206
2004/0120250 A1 * 6/2004 Langevin et al. ............. 370/216
2008/0133935 A1 6/2008 Elovici et al.
2008/0240443 A1 10/2008 Vuillaume et al.
2009/0300774 A1 * 12/2009 Makkinejad ..................... 726/27

FOREIGN PATENT DOCUMENTS

CN 10174552 A 6/2010

OTHER PUBLICATIONS

Kohli et al, "Secure Message Communication using Digital Signatures and Attribute based Cryptographic Method in VANET," International Journal of Information Technology and Knowledge Management, Jul.-Dec. 2010, vol. 2, No. 2, pp. 591-594.
Fathi et al, "Leakage-Resilient Security Architecture for Mobile IPv6 in Wireless Overlay Networks," IEEE Journal on Selected Areas in Communications, vol. 23, No. 11, Nov. 2005.
Fournet et al, "Information-Flow Types for Homomorphic Encryption," Jun. 2011.
Rescorla, "Preventing the Million Message Attack on Cryptographic Message Syntax (RC 3218)," Internet Society Request for Comments (RFCs), Jan. 2002.
IBM Technical Disclosure, "A method to edit digital data using external media without information leakage," IPCOM00018939D, Nov. 9, 2009.

* cited by examiner

*Primary Examiner* — William Powers
(74) *Attorney, Agent, or Firm* — Jeffrey S. LaBaw; David H. Judson

(57) ABSTRACT

A method to prevent information leakage in a cryptographic protocol is implemented in a network device. The method implements an error message processing strategy to mask information otherwise useful to an attacker and that has been generated (by decryption processes) as a consequence of an attacker's exploit. The technique avoids information leakage associated with a padding oracle attack. In one aspect each error message (irrespective of its content) is replaced with a generic error message so that the attacker does not obtain the specific error message content(s) that might otherwise provide useful information. In addition to masking the error message content, the technique preferably implements a "delay" policy that delays the transmission of particular error messages (or message types) to hide (from the attacker's point-of-view) whether a particular error message is relevant to (or a consequence of) the attacker's exploit.

8 Claims, 3 Drawing Sheets

AVOIDING PADDING ORACLE ATTACKS

BACKGROUND OF THE INVENTION

1. Technical Field

This disclosure relates generally to cryptographic protocols by which messages are exchanged over a network.

2. Background of the Related Art

Service-Oriented Architectures enable the creation of composite applications that are comprised of reusable, loosely-coupled service components. Using the Simple Object Access Protocol (SOAP), Service Oriented Architecture (SOA) clients can invoke web services built atop the eXtensible Markup Language (XML) without explicit support for a wide variety of transport protocols and formats. A SOAP facade that sits in front of a legacy service may be constructed to enable web service virtualization, where clients invoke a virtualized version of the underlying service, thereby mitigating the need to understand intricate details of the service's implementation.

Appliances built purposely for performing traditional middleware service oriented architecture (SOA) functions are becoming more prevalent in certain computer environments. For example, SOA middleware appliances may simplify, help secure or accelerate XML and Web services deployments while extending an existing SOA infrastructure across an enterprise. The move toward middleware appliances that are built for SOA functions purposefully is predicated, at least in part, by the observation that conventional software solutions have increased processing requirements of SOA-based payloads despite the broad functional platforms, flexibility and customization available in conventional software solutions.

The utilization of middleware-purposed hardware and lightweight middleware stacks can address the performance burden experienced by conventional software solutions. In addition, the appliance form-factor provides a secure, consumable packaging for implementing middleware SOA functions. One particular advantage that these types of devices provide is to offload processing from back-end systems. To this end, it is well-known to use such middleware devices to perform computationally-expensive processes related to security. Thus, it is known that these devices provide various security-related functions including, without limitation, message encryption and decryption, digital signature checking and verification, and the like.

Some encryption schemes, such as cipher block chaining (CBC), encrypt data in chunks (or blocks) of a given size. When the data to be encrypted does not fit within a certain block size, it is necessary to add "padding" to the last block being encrypted. During decryption, the padding is removed and verified. If the padding is invalid, some decryption processes throw an exception in the form of an error message or code.

It has been known for some time that some block ciphers used in this way are subject to a compromise, known as a "padding oracle attack." An "oracle" usually is formed as an unintended side-effect of a normal processing function. A padding oracle is when an attacker uses the regular decryption function to distinguish between encrypted messages that have valid and invalid padding (even if neither type of message decrypts properly). In effect, the attacker misuses the decryption process to discover something about the plaintext form of the encrypted messages he is modifying. This type of attack typically works by exploiting the information revealed by error messages that are generated by the decryption mechanisms.

This attack typically works as follows. Consider two systems exchanging encrypted messages over a public network. An attacker captures one such message and wishes to decrypt it. For certain encryption schemes (such as those that use block-based techniques and that do not perform data integrity checks), the attacker can use the intended recipient of the message to help with this attack. To do so, the attacker makes small modifications to the captured message and re-transmits the modified message to the original recipient. The decryption process may detect an error, or it may succeed. If it succeeds, the recipient's next processing stage is likely to detect an error. The details of precisely what the error was, e.g., whether it was detected in the decryption process, or whether it was detected in a subsequent processing stage, and if so, the precise nature of the error, "leak" information about the decrypted data. The information that is leaked typically is a function of the original plaintext and the modifications performed by the attacker. For certain cryptographic modes used in the decryption process, this information leakage is such that, after a number of similar modifications and re-transmissions, the attacker may be able to determine the original plaintext content of the original message or even cause the oracle to decrypt messages (sent by the attacker) using the oracle's key. Thus, the fundamental weakness that the attack exploits is that useful information (namely, about errors in the decrypted data) is potentially revealed to the attacker.

The above-described problem is not limited just to padding schemes. While padding was the target of the earliest published form of the attack, the approach is more general in that it can target several different ways that a message can be malformed. Thus, a similar type of attack can be carried out whenever the recipient, in rejecting an encrypted message, reveals information about the type of problem that caused the message to be rejected, thereby allowing the attacker to make small changes to the message repeatedly and determine the effects of those changes via the error messages returned.

Avoiding such attacks would enhance a middleware (or other device) that provides such message processing capabilities.

BRIEF SUMMARY OF THE INVENTION

According to this disclosure, a method to prevent information leakage in a cryptographic protocol is implemented in a network device, such as a middleware appliance. The method provides a way to avoid cryptographic attacks, such as padding oracle attacks. The method implements an error message handling function that has the effect of masking information that might otherwise be useful to an attacker and that has been generated (by decryption processes) as a consequence of an attacker's exploit. As used herein, an "error message" that is processed by the novel error message handling function is one that may be generated (typically by a decryption process) in the usual course of attempting to decrypt an encrypted message.

In particular, the technique avoids the type of information leakage associated with a padding oracle attack by enforcing several types of error message processing, with the types preferably implemented together. In one aspect of the message processing strategy of this disclosure, each error message (irrespective of its content) is replaced with a generic error message (such as "internal error") so that the attacker does not obtain the specific error message content(s) that might otherwise provide useful information (to the attacker). In addition to masking the error message content, the technique preferably implements a "delay" policy that delays the transmission of particular error messages (or message types)

in such a manner so as to hide (from the attacker's point-of-view) the details of the underlying error that caused the error message to be emitted. In one embodiment, an error message is delayed (typically by a variable amount) so that, as seen from the outside (by an attacker), a time period between receipt of the message to be decrypted and the generation of the error message is fixed, irrespective of when an internal decryption process (or subsequent processing stage) throws the error. In this embodiment, a timer (or clock) is initiated upon receipt of the message, and any error message generated during the decryption process is delayed until the timer expires (representing the fixed amount of time as measured from the receipt). Thus, for example, if the system is set to delay messages for one (1) second from receipt and an error message is generated at 0.4 seconds, the message is delayed a further 0.6 seconds before it is released. When this type of delay message-processing is implemented, the attacker will always see that an error message gets generated (if at all) and issued at a same time relative to the message receipt. As such, the attacker cannot learn any useful information from the mere "timing" of the error messaging, as the relevant error messages will each appear to be issued in a temporally-consistent manner.

A variation of this time delay approach is to use an intended delay time that is altered dynamically, e.g., based on observed behavior or other factors. In this approach, an actual time taken to receive an error message (following receipt of the incoming message) is measured; if this time is larger than a configured delay, the intended delay can be increased. This allows for a relatively short delay interval to be initially specified, and if the short delay interval is smaller than necessary, the interval is increased automatically (e.g., by a given increment or increments) until it is sufficient to mask the actual error time.

Another variation recognizes that the time taken for decryption may not be relevant to the attack, in which case the timer itself is delayed (i.e., not started) until such time as the decryption phase ends (but before the padding has been verified).

The described padding oracle attack protection techniques, which may be used alone or in combination with one another, in effect "mask" (or hide) the error messages such that the decryption function does not "leak" information about the processing of the encrypted message that might be useful to an attacker.

According to an embodiment, the above-described techniques are implemented in a network appliance that performs decryption of encrypted messages, such as messages that are XML-based. In this appliance, typically there is a standard message processing path, as well as an error processing path. According to this embodiment, the usual error path is augmented to include the described functionality. Because only error messages are manipulated, the throughput in the standard message processing path (i.e., where there is no error) is unaffected. The approach allows the original error message to be logged, while only returning a generic error to the client. If desired, the appliance also can set a flag to indicate if decryption has been invoked, and the error processing path can test this flag to determine whether the error messaging processing should even be turned on (applied). This approach is useful because the described schemes need only be used if decryption has been performed. If (other) errors occur before decryption, these errors can be reported to the client without concern, as typically they will be unrelated to any potential padding oracle attack.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN
ILLUSTRATIVE EMBODIMENT

Figure 1:
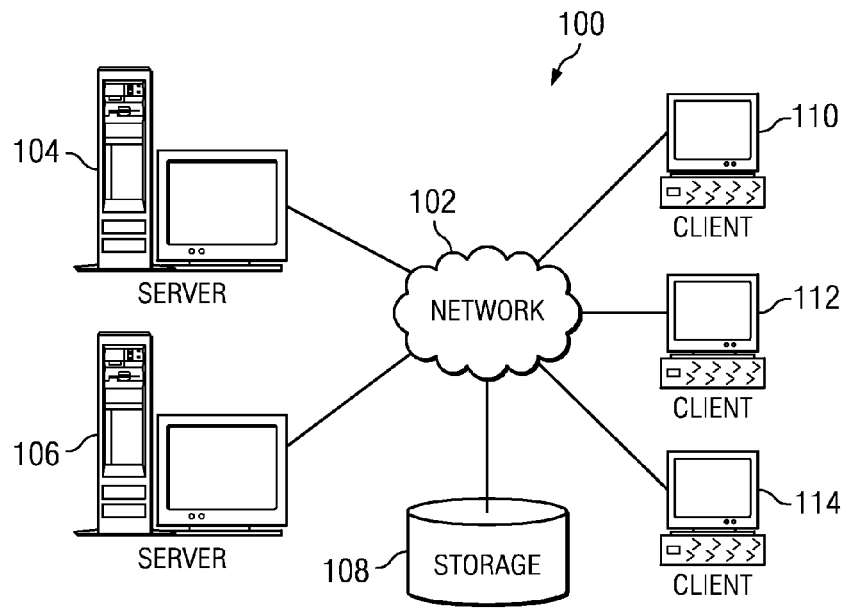
FIG. 1 depicts an exemplary block diagram of a distributed data processing environment in which exemplary aspects of the illustrative embodiments may be implemented.
Figure 2:
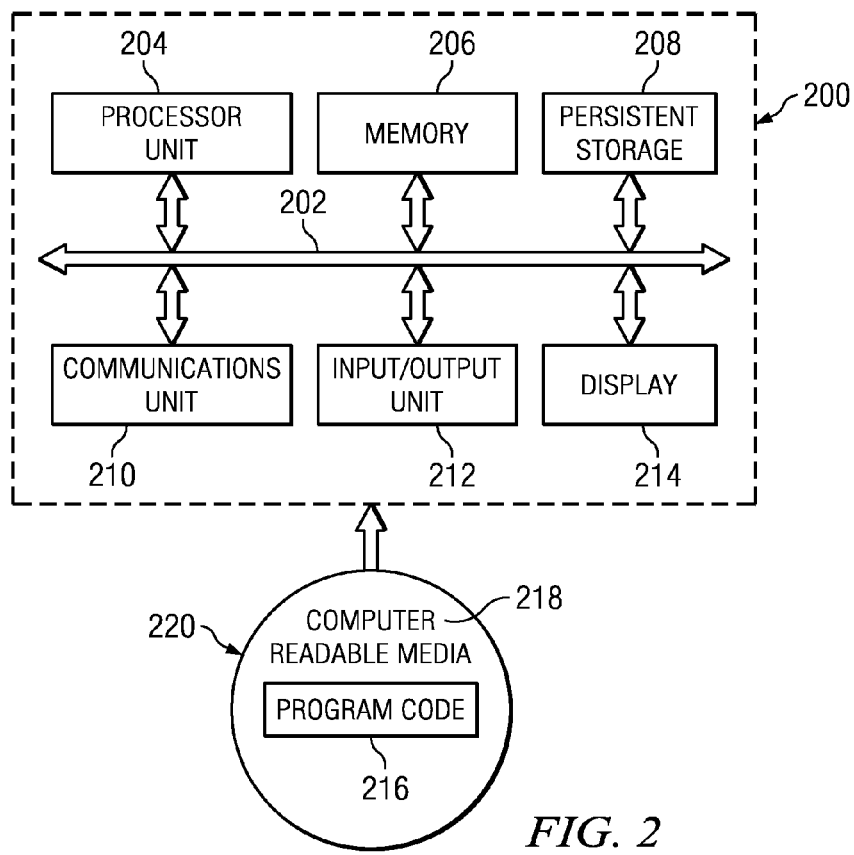
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Although not meant to be limiting, a representative data processing system in which the techniques of this disclosure are implemented is a Service Oriented Architecture (SOA) appliance. SOA middleware appliances accelerate XML and Web services deployments while extending an existing SOA infrastructure across an enterprise. The utilization of middleware-purposed hardware and lightweight middleware stacks provides a secure, consumable packaging for implementing middleware SOA functions. Representative appliances include, without limitation, the DataPower® accelerator devices available from IBM of Armonk, N.Y., USA. A representative appliance of this type provides common XML message transformation, XML processing, integration, MQ/HTTP/FTP connectivity, transport mediation, and routing and security functions. These security functions include encryption/decryption, digital signature generation and verification, message validation, and the like. By offloading such computationally-intensive tasks from the back-end systems, a middleware appliance of this type provides significant advantages.

As noted above, network devices that provide decryption functions are subject to padding oracle attacks. The techniques that will now be described provide an error message handling strategy that mitigates these attacks. As used herein, an "error message" is a construct (irrespective of its format as a message, a code, a signal, a page, or the like) that is normally output from a decryption process in the usual course of decrypting an encrypted message. In general, the error message handling strategy typically is implemented as a program, a process, an execution thread, or the like within the context of a data processing system that includes such decryption functionality. It may be implemented distinct from that decryption functionality or as a component thereof. In a representative embodiment, the technique is implemented in the context of an appliance-based web management tool, such as the DataPower® product, which is available commercially from IBM. Of course, the identification of this commercial product is not meant to be taken to limit the disclosed subject matter. More broadly, any system, device, program, product or service that implements a cryptographic protocol vulnerable to a padding oracle attack may implement the teachings of this disclosure.

Padding Oracle Attack Mitigation

Figure 3:
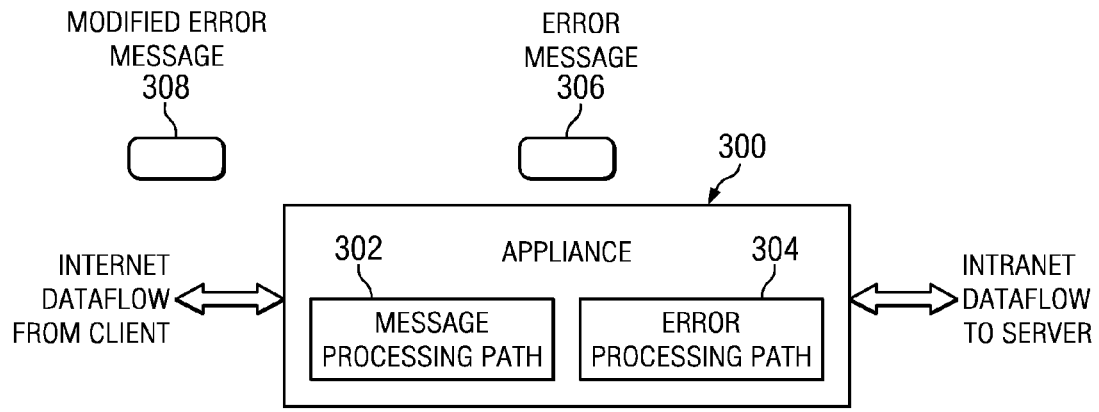
FIG. 3 illustrates a representative network appliance that includes message handling and error processing paths that may augmented to provide the described error message handling functionality.

FIG. 3 represents an embodiment of a network appliance 300 that comprises a standard message processing path 302, and an error message processing path 304. The network appliance is one that sits between a network and a receiving entity (or "recipient"), such as a server. In a typical but non-limiting use case, the network appliance acts as a front-end to a back-end system, such as a web or application server, and the appliance acts to offload certain back-end processing from the back-end system. More generally, the appliance is an intermediary between two computing systems (or, more generally, entities) that exchange messages over the network. The messages may be encrypted to secure the content from discovery. In this embodiment, which is not intended to be limiting, the standard message processing path 302 typically includes a series of processing stages, and these stages operate in a known manner upon receipt of an encrypted message. In particular, in the usual case (where there is no error), the received message is applied to a decryption function to remove the encryption layer, the resulting data is applied to a post-decryption operation, e.g., to verify the padding, and the plaintext message is then forwarded to the intended recipient (e.g., the server). The recipient entity responds with a reply message, which is then encrypted by the appliance and forwarded back to the requesting client. In the circumstance in which an error occurs during decryption or the post-decryption phase, the error message processing path 304 is engaged. This path may include one or more functions (modules) or stages, such as logging, debugging, and reporting. Thus, in a typical operation in which a padding oracle attack may occur, an XML message, which has been encrypted by an external source (such as a client browser), is received over a transport connection (e.g., SOAP over HTTP) by the network appliance on its path to a back-end application server. As described, the message is supplied to the message processing path 302, which removes the encryption layer and attempts to verify the padding. If an error is generated during any such processing, the error processing path 304 is initiated. This path generates one or more error messages 306 that may be output over the network for return to the message sending entity. In an alternative to this approach, the server itself may generate one or more error messages that are intercepted by the appliance on their path back to the client. The above-described processing is conventional.

According to this disclosure, it is desired to replace the specific error messages (typically generated by the appliance, but possibly generated by the server) with modified error messages, such as message 308 in FIG. 3, that are non-specific in nature in that they do not reveal information about an error that occurred during the decryption or post-decryption operations. In addition, and because timing of the error message delivery can in some circumstances reveal useful information about the nature of the errors, the non-specific error message or messages returned to the client from the appliance preferably are processed temporally so as to delay when they are returned by the appliance. These techniques, as explained below, provide an error message handling function or strategy that helps to avoid attacks, especially padding oracle attacks.

To this end, in one embodiment, message processing path 302 is augmented to associate a timestamp with each received encrypted message to be processed. In addition, the error processing path 304 is augmented to provide an error message handling function. As described above, this error message handling function replaces any (specific) error message, preferably with a generic (or "non-specific") message (such as "internal error" or the like), and it delays output of the modified error message for a given time period from when the original message to be decrypted was received (as indicated by the timestamp). In this manner, in effect the same error message (preferably, a non-specific one), such as message 308, is sent by the error processing path for all (or substantially all) errors detected within or subsequent to decryption. The non-specific message generated by the error processing path (and returned to the client according to this technique) "masks" the true nature of any decryption error (such as the presence of an invalid character, invalid XML, or the like) described in the original error message. This helps to ensure that the attacker is not provided meaningful information about the error, e.g., a decryption error. In addition, by delaying the output of this modified error message, an attacker is prevented from using the error message timing itself to facilitate the attack. The error processing path 304, while returning the generic error message to the client, may log the original error message, which facilitates debugging and reporting.

Figure 4:
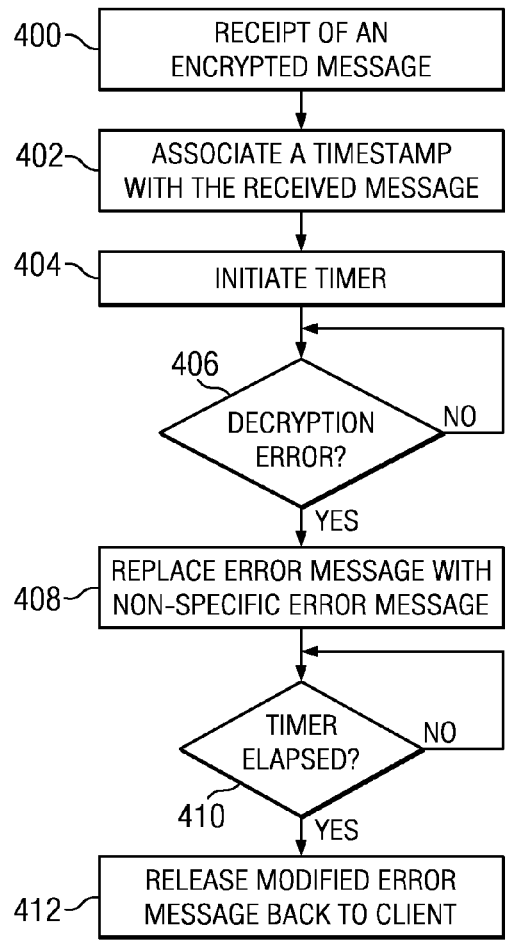
FIG. 4 is a process flow describing the error message handling functionality in a first embodiment.

FIG. 4 is a process flow illustrating a basic error message handling function according to this embodiment. The function begins at step 400 upon receipt of an encrypted message. At step 402, a timestamp is associated with the message receipt. At step 404, a timer (keyed to the timestamp) is initiated with respect to the received message. Steps 402 and 404 comprise part of the message processing stage. Decryption (not shown) is then performed. A test is performed at step 406 to determine whether a decryption error has been thrown and an error message generated. Step 406 is part of the error processing stage. If no decryption error has been thrown, the routine cycles. If, however, an error message has been generated, the routine continues at step 408 to replace the error message with a non-specific error message. At step 410, a test is performed to determine whether the timer has elapsed. If not, the routine cycles. If, however, the outcome of the test at step 410 indicates that the timer has elapsed, the non-specific error message is then returned to the client. This is step 412. The process then ends.

Figure 5:
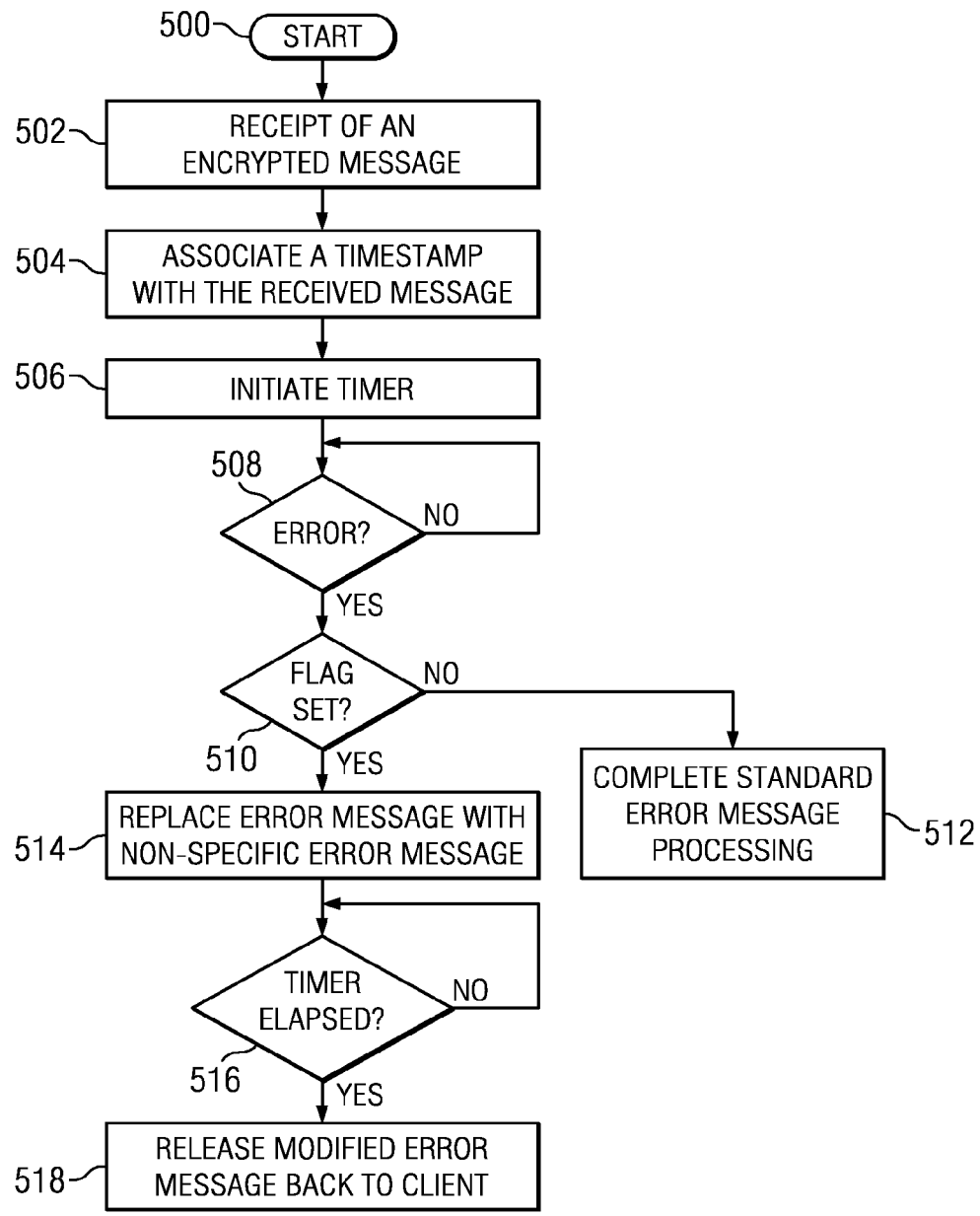
FIG. 5 is a process flow described the error message handling functionality in a second embodiment.

FIG. 5 illustrates an alternative embodiment that performs additional checking before implementing the error message handling routine. This approach recognizes that certain types of errors detected by the appliance may be unrelated to the decryption of the received message. Such errors may be reported back to the client without concern about impacts on an attack (such as a padding oracle attack) that may be in progress. The routine begins at step 500. At step 502, an encrypted message is received. The routine then continues at step 504 by associating a timestamp with the message receipt. At step 506, a timer (keyed to the timestamp) is initiated with respect to the received message. The decryption process (not shown) is then initiated, which process sets a flag that indicates decryption has been attempted by the message processing path. A test is then performed at step 508 to determine if an error in the message processing has occurred. If not, the routine cycles. If the outcome of the test at step 508 is positive, which indicates that an error has occurred, a test is performed at step 510 to determine whether the flag is set. If the outcome of the test at step 510 is negative, an error unrelated to decryption has occurred, and the routine branches to step 512, at which standard error processing is completed. Step 512 may involve sending an unmodified error message to the client, as the contents of such a message are not likely to be useful to an attacker attempt a padding oracle attack. If the outcome of the test at step 510 is positive, however, the error is related to decryption. In this event, the routine continues at step 514 to replace the error message with a non-specific error message. At step 516, a test is performed to determine whether the timer has elapsed. If not, the routine cycles. If, however, the outcome of the test at step 516 indicates that the timer has elapsed, the non-specific error message is then returned to the client. This is step 518. The flag is reset and the process ends.

In an alternative implementation (such as a custom-programmable appliance), the flag can be made available to custom code so that it can be explicitly cleared once the decrypted message has been checked sufficiently to demonstrate that the decryption was successful (and, thus, that no padding oracle attack is being mounted).

More generally, once the decryption has been verified to have been successful (proving that the message is not part of an oracle attack), preferably the error message rewriting process is (or can be) disabled so that any subsequent error messages will be returned unmodified to the client. To this end, the flag is (or can be) reset automatically or programmatically by any processing stage after decryption.

The above-described processing is invoked when decryption code itself sets the flag to indicate that decryption has been invoked. If the decryption actually is performed in the back-end server, then the flag has to be set by inspecting the message and determining if it is encrypted.

Preferably, the flag is reset either automatically or programmatically.

As described above, preferably the modified (non-specific) error message is delayed by a fixed amount so that a time period between receipt of the message to be decrypted and the generation of the error message is fixed, irrespective of when an internal decryption process (or subsequent processing stage) throws the error. In the example embodiments described, a timer (or clock) is initiated upon receipt of the message, and any error message generated during the decryption process is delayed until the timer expires (representing the fixed amount of time as measured from the receipt). When this type of delay message-processing is implemented, the attacker will always see that an error message gets generated (if at all) and issued at a same time relative to the message receipt. As such, the attacker cannot learn any useful information from the mere "timing" of the error messaging, as the relevant error messages will each appear to be issued in a temporally-consistent manner.

As one skilled in the art may appreciate, delaying the transmission of errors is an effective countermeasure if the "delay period" is longer than the time taken for an error to actually be detected and generated. In some circumstances, it may be undesirable to use excessively long delays, as state must be maintained for this period, both in the client and in the error processor, to allow the eventual transmission of the error back to the client. Thus, a variation of the time delay approach described above is to use an intended delay time that is altered dynamically, e.g., based on observed behavior or other factors. In this alternative approach, an actual time taken to receive an error message (following receipt of the incoming message) is measured; if this time is larger than an intended delay, the intended delay can be increased. This allows for a relatively short delay interval to be initially specified, and if the short delay interval is smaller than necessary, the interval is increased automatically (e.g., by a given increment or increments) until it is sufficient to mask the actual error time.

In the example embodiments, the timer is started upon receipt of the message to be encrypted. This is not a limitation. Indeed, one disadvantage of starting the clock for error message delays at the time that the initial request is received is that, because long messages take longer to decrypt, a long delay must be specified in order that long messages receive proper protection. However, the time taken for decryption is not typically relevant to such attacks, so the clock may be started later, e.g., at the end of the decryption phase, but before the padding has been verified. This approach allows the use of a much smaller delay, with correspondingly less effect of normal system behavior. Thus, according to this variation, the timer itself is delayed (i.e., not started) until such time as the decryption phase ends (but before the padding has been verified), or at some other desired point-in-time after the message is received at the appliance. In this variation, the order of steps in FIG. 4 and FIG. 5 are changed as appropriate to enforce the desired temporal constraint.

This latter variant takes advantage of the fact that the time taken for decryption is greater for long messages than for short ones, such that a fixed delay time that is right for short messages may not be long enough to mask long messages, while a delay based on a long message may hold up for quite a long time (using up memory) the error messages generated in response to short messages. By starting the timer after the decryption but before checking the padding will mean that the delay time does not have to cover the variable time taken by the decryption, but rather only the relatively short time it takes to check padding and to make other format checks on the decryption results. The ability to determine which one of these checks has failed is often the key to the padding oracle attack.

The above-described techniques, which may be used alone or in combination with one another, in effect "mask" the error messages such that the decryption function does not "leak" information about the processing of the encrypted message that might be useful to an attacker.

The padding oracle protection afforded by the disclosed technique may be activated in any convenient manner. In one approach, the network appliance includes an interface, such as a web-based configuration interface, a command line interface, or a programmatic interface, by which the functionality is activated. Thus, for example, a configuration screen may provide a selection option to turn on the padding oracle protection. When this option is enabled, the appliance manipulates error messages to avoid revealing internal cryptographic states. The resulting "Rewrite Error Messages" configuration setting controls whether to rewrite error messages to avoid providing a padding oracle. When enabled, the default operation is as described above, namely, that the client receives error messages without the internal information that could lead to a discovery of the internal states. When disabled, the client receives the original message with this information. Although not meant to be limiting, the syntax of the Rewrite Error Message setting may be as follows: rewrite-errors {on|off}.

The described error message handling (and padding oracle protection) function provides significant advantages. It addresses the fundamental weakness (error messages that may disclose or lead to disclosure of internal cryptographic states) that a padding oracle attack is designed to exploit. It does not require implementation changes to cryptographic protocols (unless the protocol specifies the exact error that must be returned for different types of failure), or to the code that generates the error messages during the usual course of processing the message. It also addresses an attack vector that seeks to exploit the error message timing. The technique can be implemented conveniently in-line as messages traverse the network device. Because the approach only affects error messages, it does not have a performance impact on valid traffic, and there is no performance decrease on the success path.

By using the above-described techniques, when an encrypted message is decrypted, in effect the only information that the system reveals is that the decryption failed. The techniques advantageously hide the details of the underlying error that caused a particular error message to be emitted.

The described implementation (a middleware appliance) is merely exemplary, as the error message handling function may be carried out in any product, device, system, program or process. The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As noted, the padding oracle attack protection scheme described herein may be implemented in or in conjunction with various server-side architectures including simple n-tier architectures, web portals, federated systems, and the like. Also, the techniques herein may be practiced in a loosely-coupled server (including a "cloud"-based) environment. The error message processing functionality itself may be hosted in the cloud.

Still more generally, the subject matter described herein can take the form of an entirely hardware embodiment, an entirely software embodiment or an embodiment containing both hardware and software elements. In a preferred embodiment, the error message handling function is implemented in software, which includes but is not limited to firmware, resident software, microcode, and the like. The error messaging processing strategy (whether to rewrite an error message into a generic form to mask its contents, whether to delay transmission of the error message to obscure its relevance, when and how the delay should be implemented, and the like) can be configured into a data structure and stored in a data store, such as computer memory.

Furthermore, as noted above, the error message processing functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the error messaging processing components are implemented in a special purpose computer, preferably in software executed by one or more processors. The associated configuration data is stored in an associated data store. The software also is maintained in one or more data stores or memories associated with the one or more processors, and the software may be implemented as one or more computer programs.

The error message processing function may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

As noted, the techniques disclosed herein are not limited to a Web-based middleware appliance, but this will be a typical implementation. As noted, the above-described function may be used in any system, device, portal, site, or the like wherein one or more objects are managed (administered) through a browser (or other rendering program).

Of course, the above examples are merely illustrative and not meant to limit the disclosed technique.

Having described our invention, what we now claim is as follows.

The invention claimed is:

1. A method to prevent information leakage in a cryptographic protocol operative between systems exchanging messages over a network, the cryptographic protocol supporting decryption of encrypted data, the method comprising:
   capturing an error message prior to its output over the network, the error message having been generated as a result of a decryption error occurring during decryption of encrypted data;
   replacing the error message with a modified error message to mask information about a decryption error; and
   following expiration of a given time period having a length that masks when the error message was generated, outputting over the network the modified error message in lieu of the error message;
   wherein at least one of the capturing, replacing and outputting steps is carried out in software executing in hardware.

2. The method as described in claim 1 wherein the modified error message is a generic error message that, in contrast to the error message, does not provide information about the decryption error.

3. The method as described in claim 1 wherein the modified error message is output irrespective of a nature of the error that caused the error message to be generated.

4. The method as described in claim 1 wherein the given time period is measured from receipt of the encrypted data.

5. The method as described in claim 1 wherein the given time period is measured from an end of a decryption operation.

6. The method as described in claim 1 wherein the given time period is one of: a fixed period, and a variable time period.

7. The method as described in claim 1 wherein the error message is a message generated upon decryption and indicates a padding error.

8. The method as described in claim 1 further including determining whether the error message is generated as a result of a decryption operation by the following sub-steps:

setting a flag to indicate if a decryption operation has been invoked;
responsive to detecting an error, determining whether the flag has been set; and
if the flag has been set, performing the capturing, replacing and outputting steps.

\* \* \* \* \*